No. 815,196. PATENTED MAR. 13, 1906.
J. J. MILLER.
MACHINE FOR MAKING WIRE BOUND BOX BLANKS.
APPLICATION FILED JUNE 10, 1905.
11 SHEETS—SHEET 1.
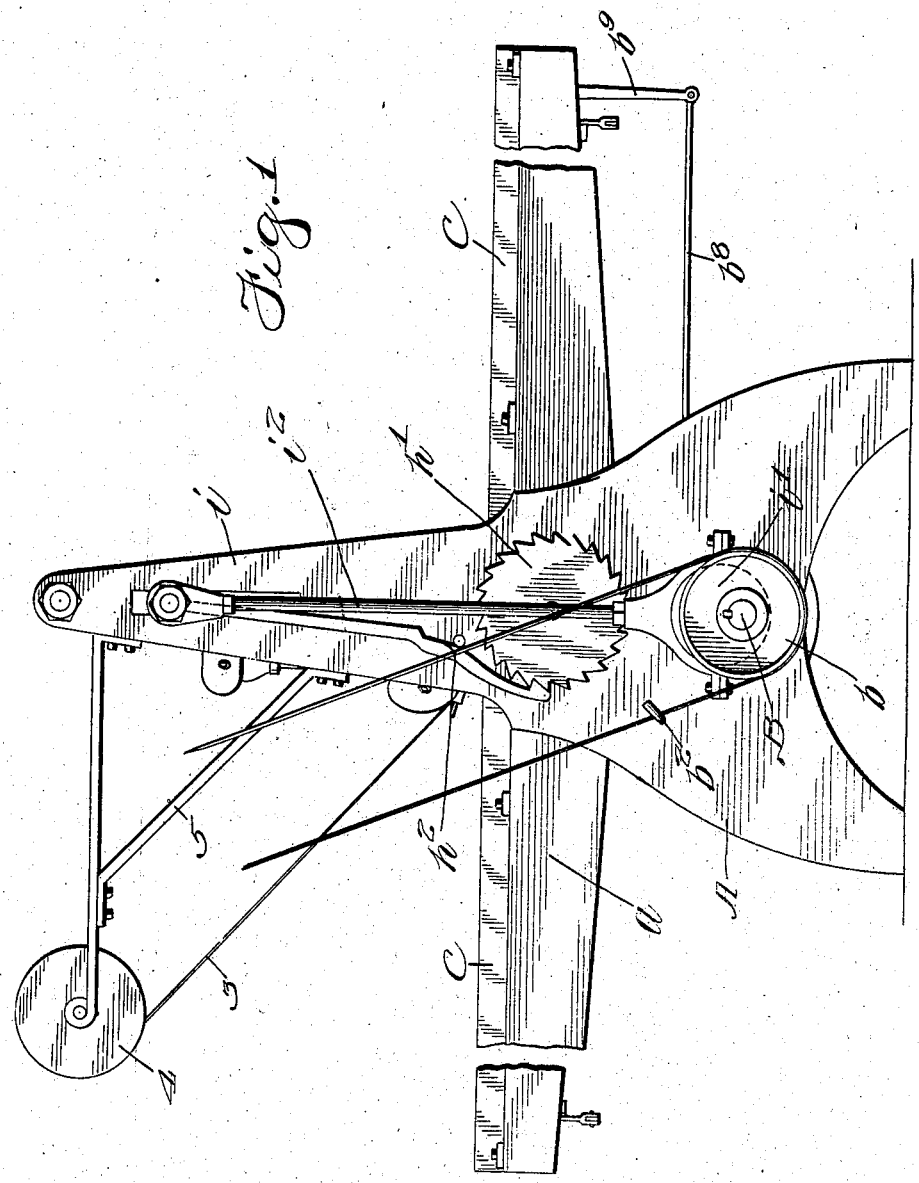
Witnesses:
J B Weir
Ira R Perry
Inventor:
Julius J. Miller
By Bulkey & Durand
Attorneys

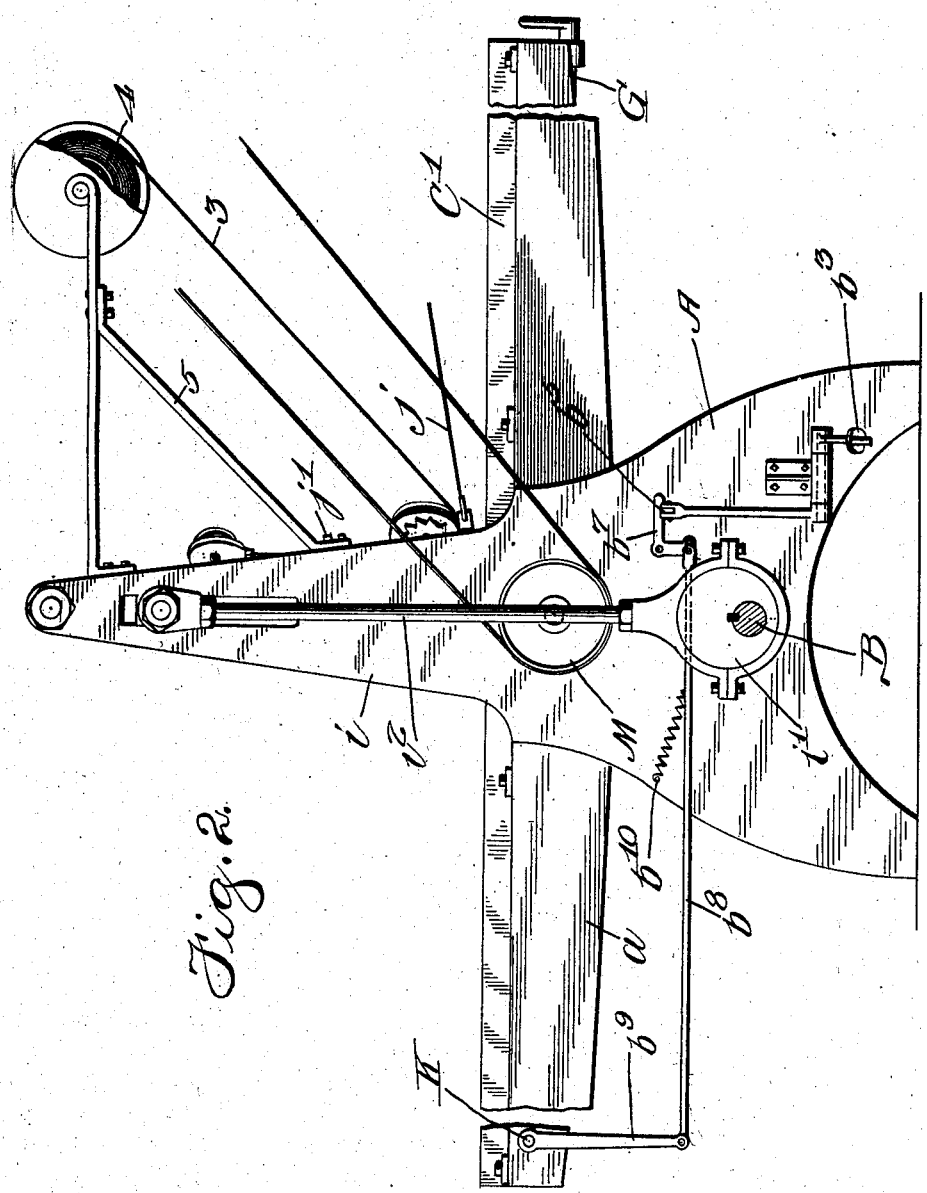

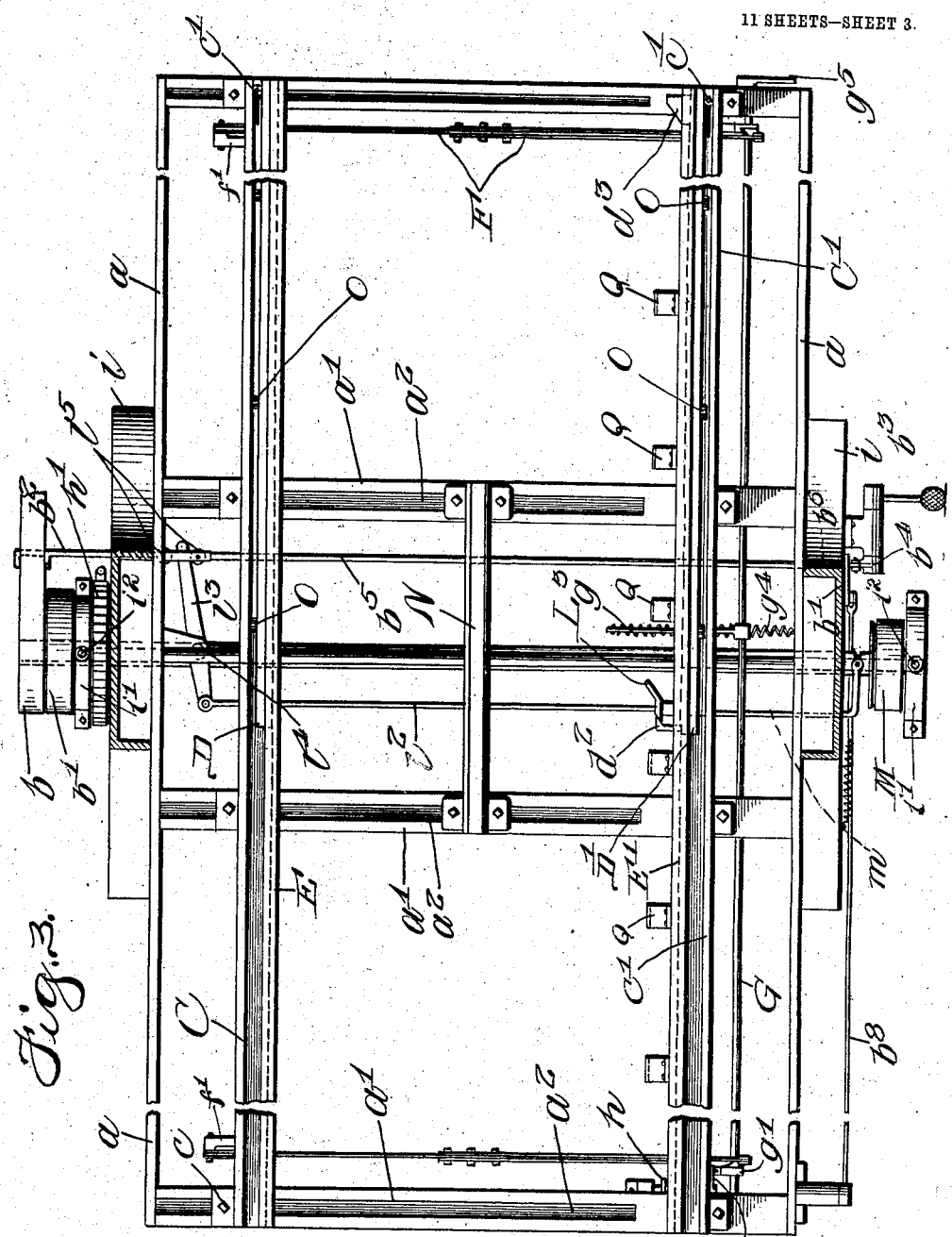

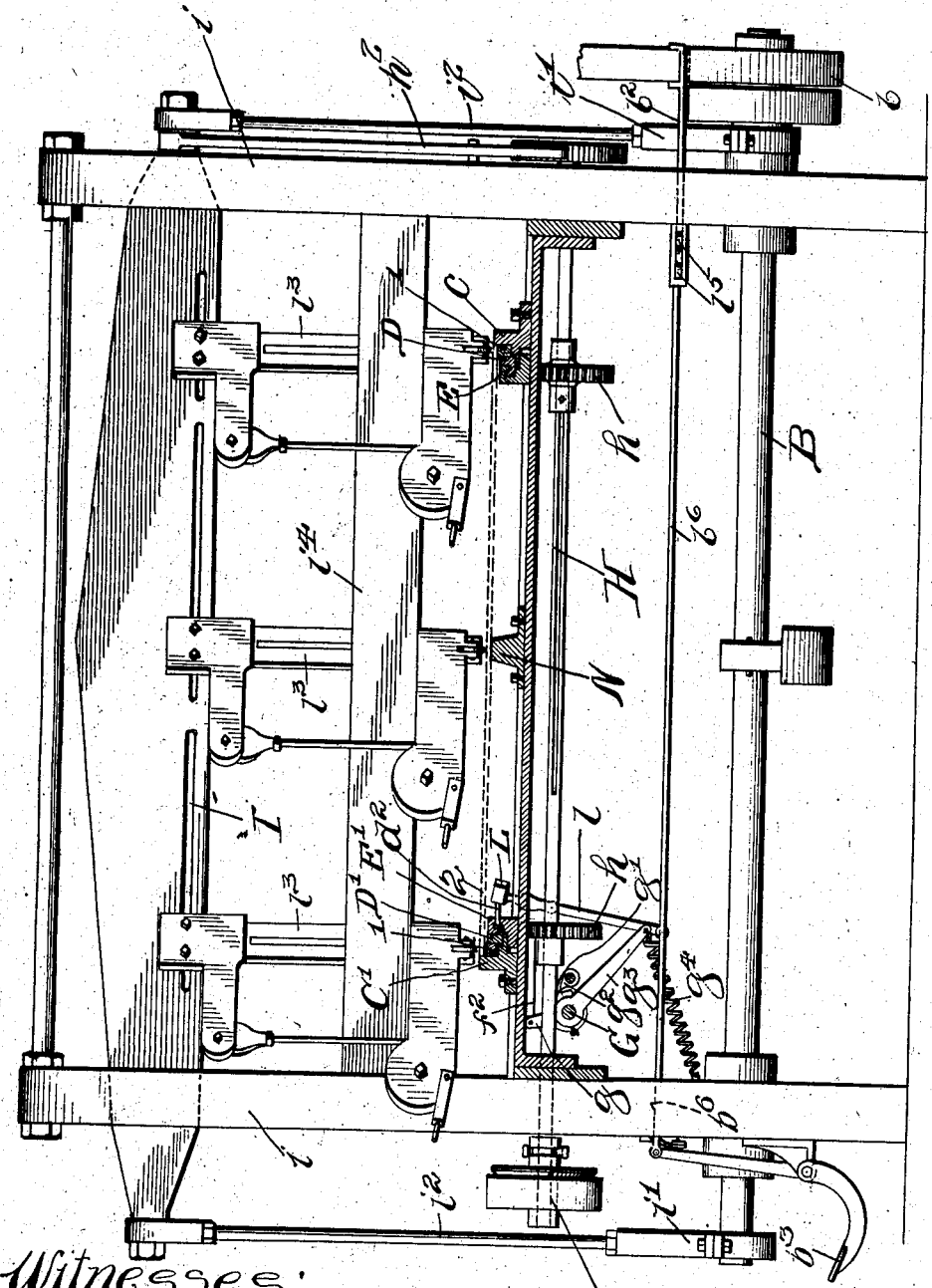

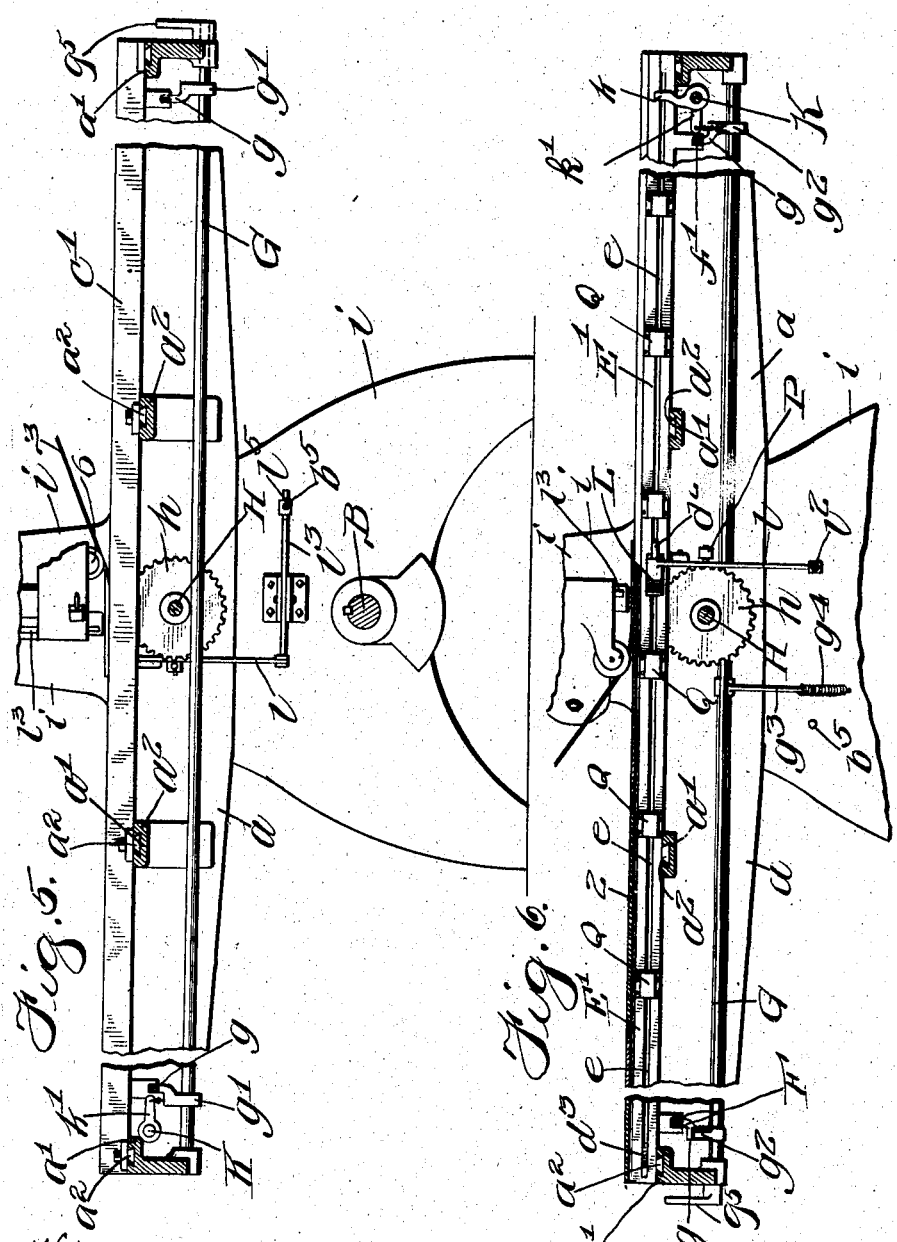

No. 815,196. PATENTED MAR. 13, 1906.
J. J. MILLER.
MACHINE FOR MAKING WIRE BOUND BOX BLANKS.
APPLICATION FILED JUNE 10, 1905.
11 SHEETS—SHEET 6.
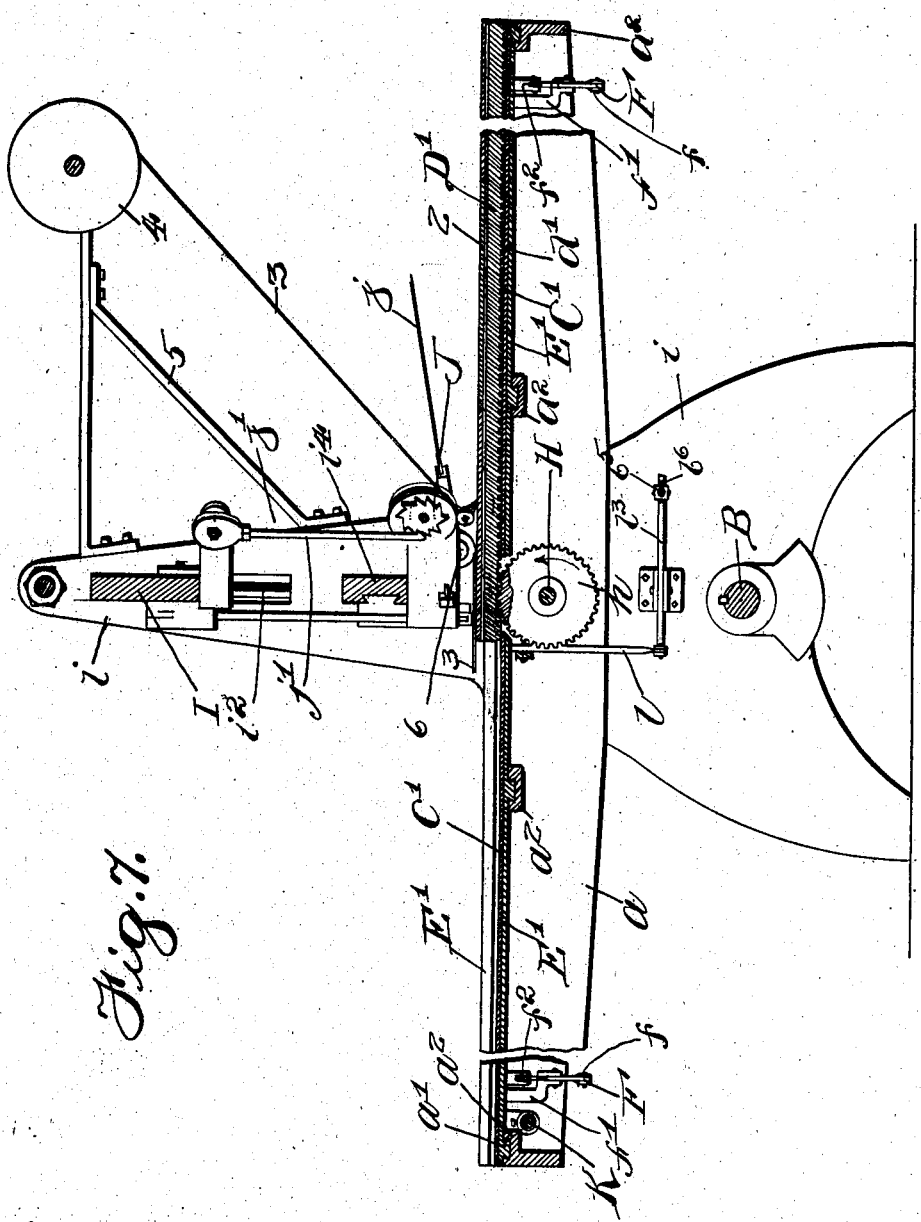

No. 815,196. PATENTED MAR. 13, 1906.
J. J. MILLER.
MACHINE FOR MAKING WIRE BOUND BOX BLANKS.
APPLICATION FILED JUNE 10, 1905.
11 SHEETS—SHEET 7.
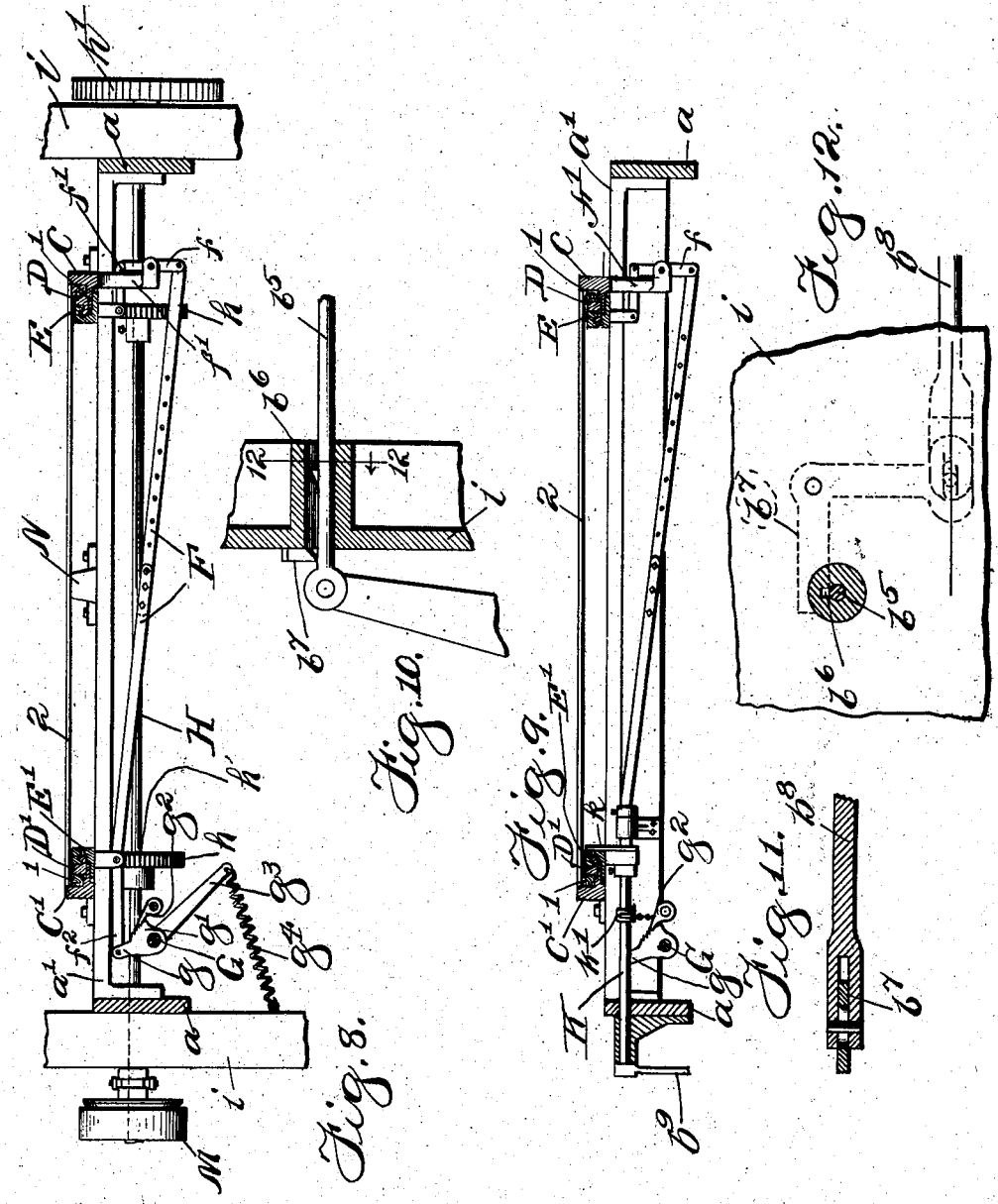
Witnesses:
J B Weir
Inventor:
Julius J. Miller
By Bulkley & Durand
Attorneys

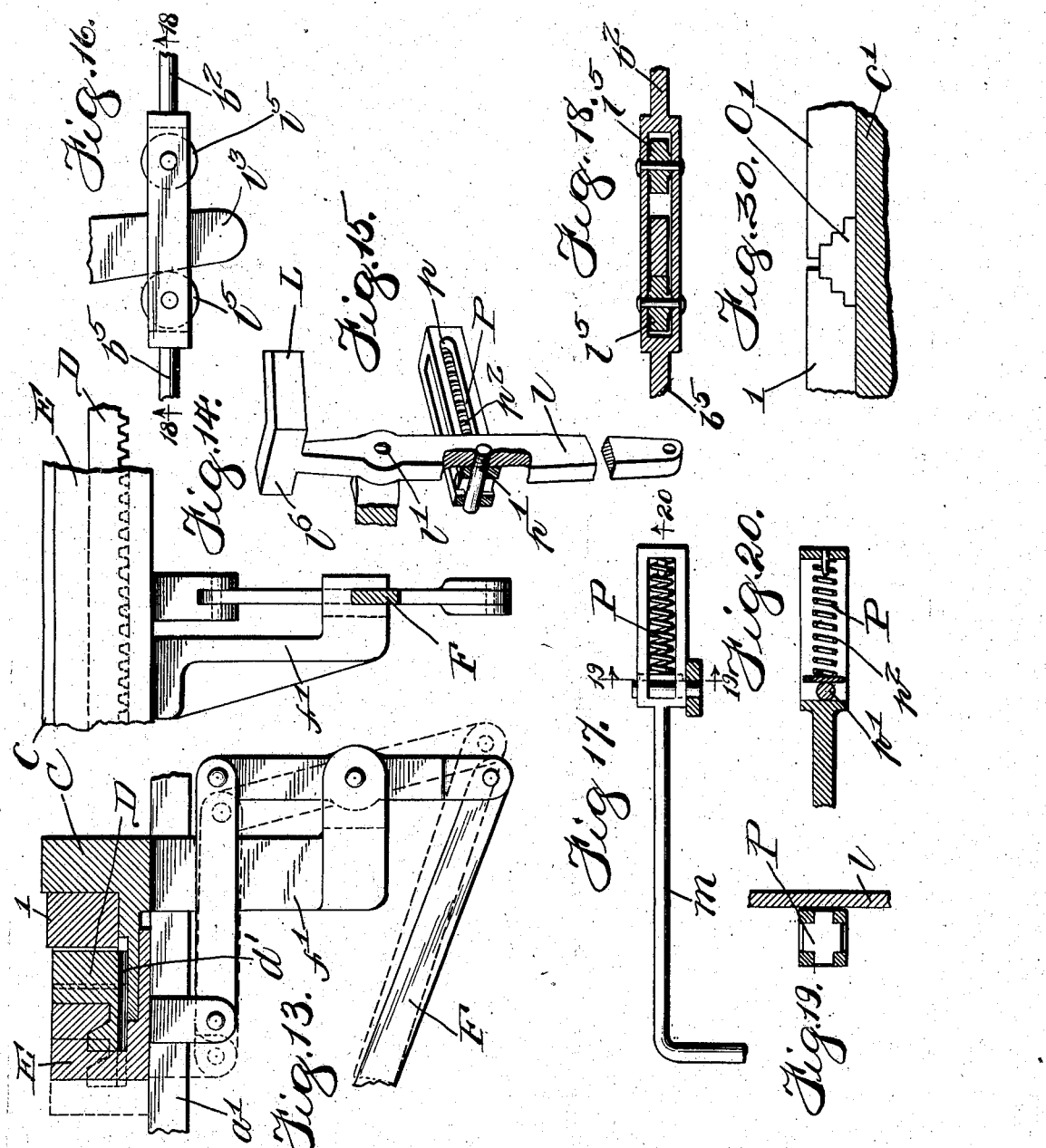

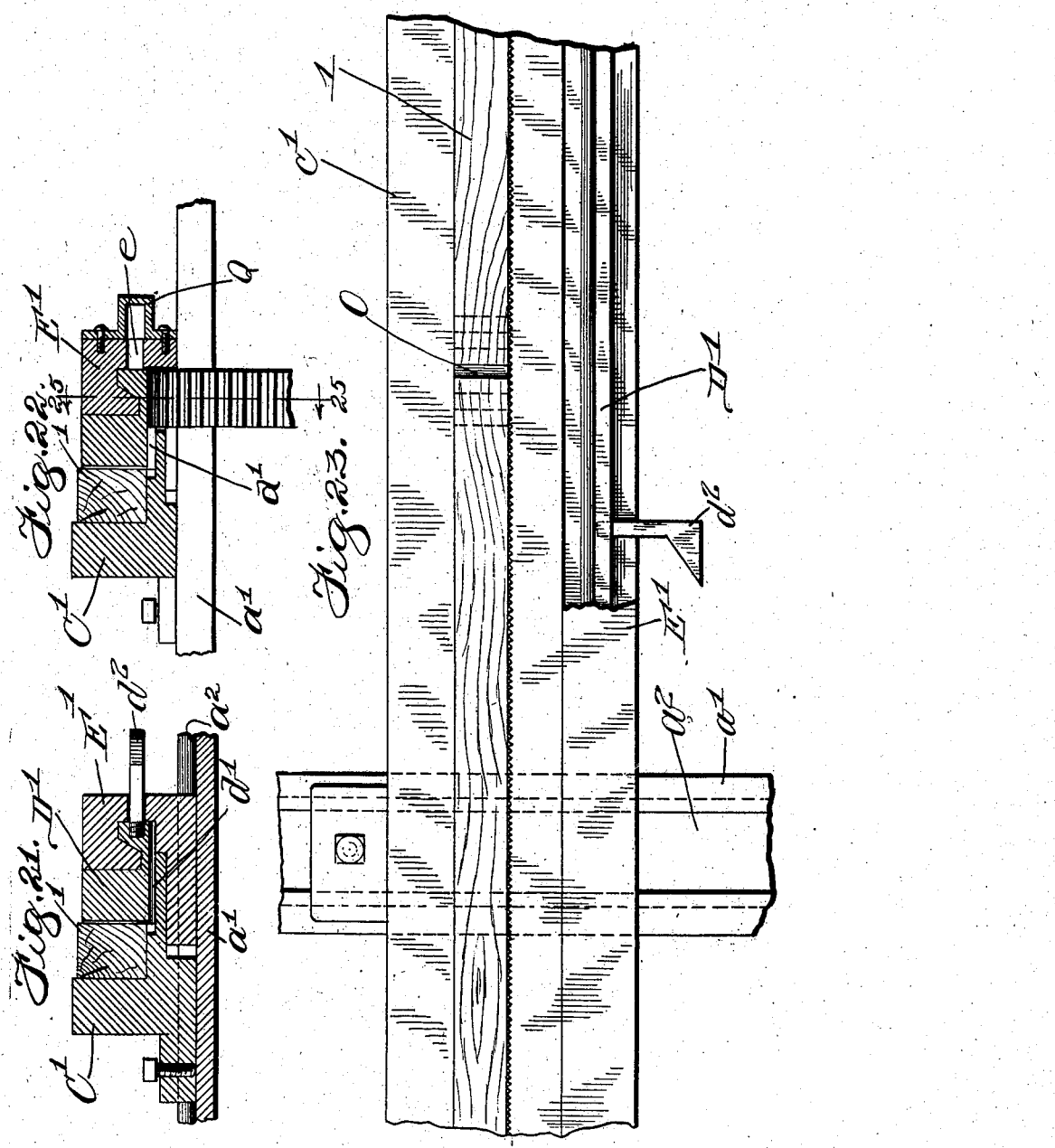

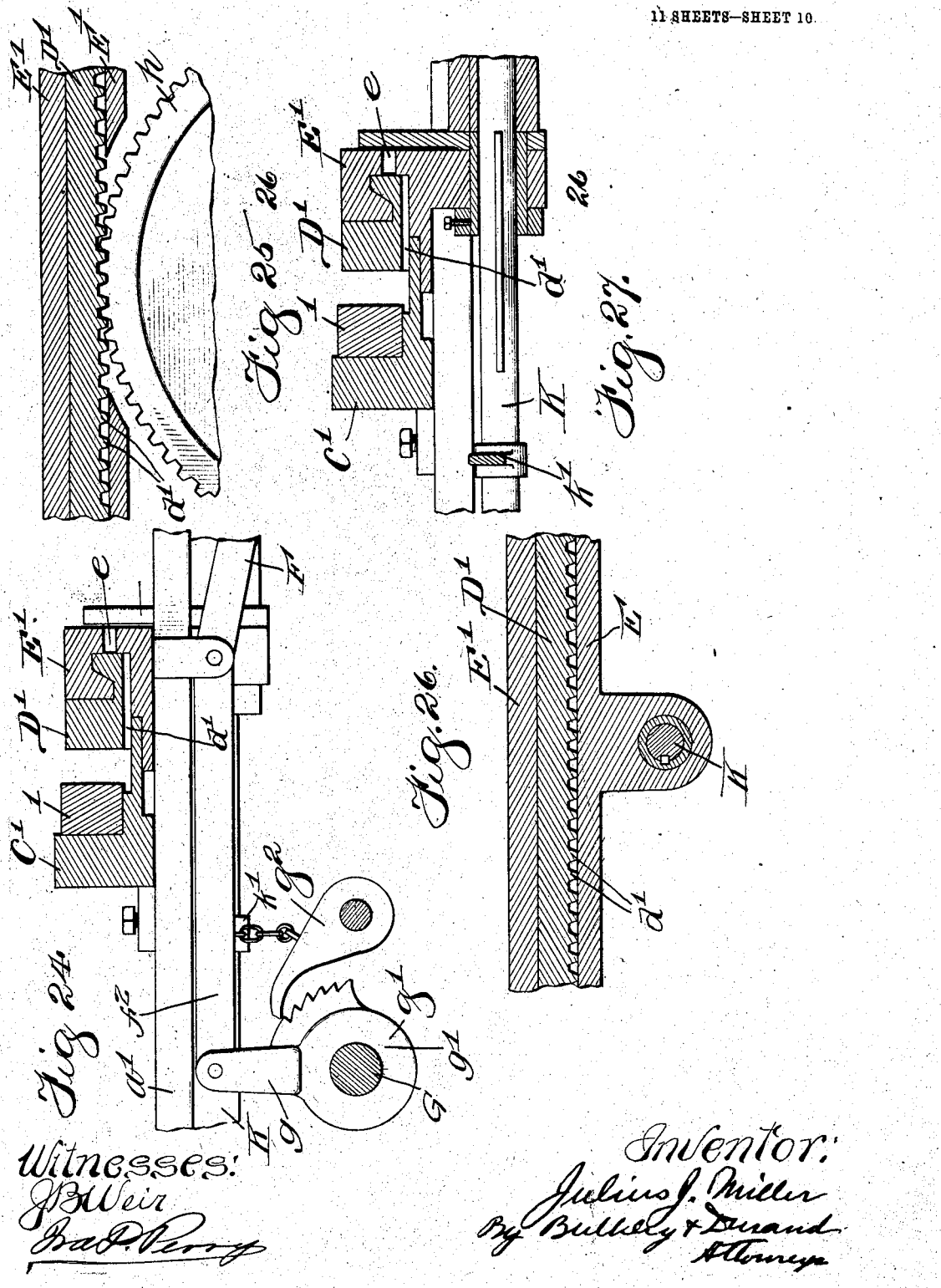

No. 815,196. PATENTED MAR. 13, 1906.
J. J. MILLER.
MACHINE FOR MAKING WIRE BOUND BOX BLANKS.
APPLICATION FILED JUNE 10, 1905.
11 SHEETS—SHEET 11.
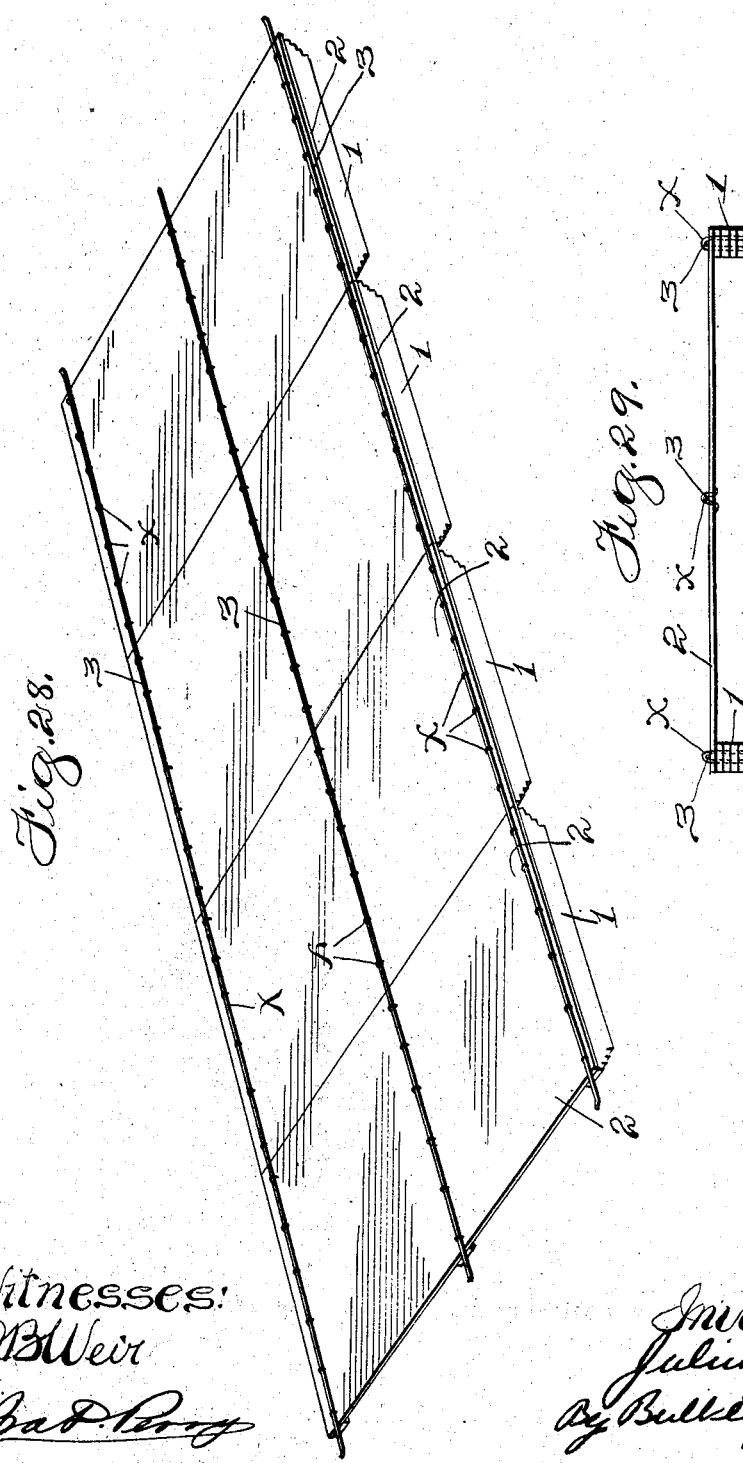
Witnesses:
J B Weir
Inventor:
Julius J. Miller
By Bulkley & Durand
Attorneys

UNITED STATES PATENT OFFICE.

JULIUS J. MILLER, OF ST. JOSEPH, MICHIGAN, ASSIGNOR TO WILLIAM P. HEALY, OF CHICAGO, ILLINOIS.

MACHINE FOR MAKING WIRE-BOUND BOX-BLANKS.

No. 815,196.      Specification of Letters Patent.      Patented March 13, 1906.

Application filed June 10, 1905. Serial No. 264,545.

*To all whom it may concern:*

Be it known that I, JULIUS J. MILLER, a citizen of the United States of America, and a resident of St. Joseph, Michigan, have invented a certain new and useful Improvement in Machines for Making Wire-Bound Box-Blanks, of which the following is a specification.

My invention relates to machinery for use in making metal-bound boxes or packages—such, for example, as the well-known wire-bound packing-boxes—and it relates more particularly to machinery for use in making the wire-bound blanks from which the sides of the boxes or packages are constructed, and especially to machines which are adapted when supplied with the cleats, veneering, and wire to automatically convert these materials into box-blanks composed of sections flexibly connected by the binding-wires and having their edges reinforced on the inner surfaces of the blank by means of cleats or narrow strips of wood adapted to be fastened to the heads or end walls which constitute part of the completed product.

Generally stated, the object of my invention is the provision of an improved and highly-efficient machine for making box-blanks of the foregoing general character.

Special objects of my invention are the provision of improved means for holding the cleats and veneering and for holding the cleats end to end at each side of the blank, as well as for keeping the endwise motion of the cleats direct; to provide an improved construction and arrangement whereby the cleats, veneering, &c., may be carried and maintained in their proper relative positions during the operation of driving the staples by which the binding-wires and cleats are secured to the outer and inner surfaces of the veneering by means of a reciprocating work-holder—that is to say, a work-holding means capable of taking hold of the materials from which the blanks are made and carrying the same forward in a step-by-step manner—and which is capable of then automatically returning to its normal position or starting-point after the staples have all been driven and the finished product has been delivered at the other end of the machine; to provide an improved construction and arrangement whereby the stapling mechanism—that is, the devices for forming and driving the necessary staples—are automatically thrown out of operation as soon as the blank is completed and retained out of operation until after the work-holder or work-holding means returns to its normal position or starting-point and until after the attendant or operator has been given sufficient time in which to again load it with the proper materials and before again starting the machine; to provide an improved construction and arrangement, whereby the work-holding means, guides, &c., will readily accommodate themselves to the production of blanks of different lengths and widths; to provide an improved construction and arrangement, whereby the work holding and feeding means will automatically release itself from the work as soon as the blank is finished, and to provide certain details and features of improvement tending to increase the general efficiency and serviceability of a machine of this particular character.

To the foregoing and other useful ends my invention consists in matters hereinafter set forth and claimed.

In the accompanying drawings, Figure 1 is a side elevation of a machine embodying the principles of my invention. Fig. 2 is a similar view of the other side of said machine. Fig. 3 is a plan of the said machine. Fig. 4 is an enlarged cross-section of said machine. Fig. 5 is a longitudinal section showing one side of the machine. Fig. 6 is a longitudinal section showing the other side of the machine. Fig. 7 is a longitudinal section showing the same side of the machine shown in Fig. 5, but taken on a different line. Fig. 8 is a detail cross-section. Fig. 9 is another detail cross-section. Figs. 10, 11, and 12 are detail views showing different features of construction. Fig. 13 is an enlarged cross-section of one side of the bed and work-holder—that is, of one of the longitudinal guides and one side of the work holding and feeding means. Fig. 14 is a side elevation of the devices shown in Fig. 13. Figs. 15 to 20, inclusive, are detail views showing various features of construction hereinafter described. Fig. 21 is a view similar to Fig. 13, but showing the other side of the work-holding structure. Fig. 22 is a view similar to Fig. 21, but taken on a different line. Fig. 23 is a plan view of the part shown in Fig. 21. Fig. 24 is an enlarged view of the work-holding structure shown at the left in Fig. 8, but showing the clamping-bar withdrawn from the cleats. Fig. 25 is a section similar to Fig. 13, but taken on a different line. Fig. 26 is a vertical section on line 26 26 in Fig. 27. Fig. 27 is a view similar to Fig. 13, but showing the opposite side of the work-holding structure. Fig. 28 is a perspective of a box-blank of the character manufactured by the said machine. Fig. 29 is an end view of the said box-blank. Fig. 30 is a detail showing one of the miter-blocks employed for separating the ends of the cleats.

As thus illustrated, my invention comprises a frame or body A, adapted to support the various operative parts in suitably-elevated positions. At a point below the horizontal bed $a$ of the frame the driving-shaft B is supported in suitable bearings mounted on the said frame or body. The two sides of the bed $a$ are tied together by horizontally-disposed and transversely-extending supporting-bars $a'$, each supporting-bar being provided on its upper side with a longitudinally-extending dovetail groove $a^2$. Upon these supporting-bars are adjustably mounted the guides or tracks C and C', the same being held in place by suitable dovetail portions and bolts or screws $c$. With this arrangement the two longitudinally-extending and parallel guides or tracks or ways are adapted to be adjusted toward and away from each other, according to the width desired for the blanks. Referring to the various cross-sections shown in the drawings, it will be seen that these guides or ways are substantially L-shaped in cross-section, thereby affording vertical flanges against which the outer surfaces of the cleats may bear, and also horizontal surfaces or supporting-flanges upon which the bottom surfaces of the cleats may bear and rest. It will be understood that the cleats 1 of the blank shown in Fig. 28 are positioned in the said tracks or ways—that is, are arranged end to end in the said ways—the first cleats being positioned with their ends in engagement with gage-pieces $c'$, which latter are adjustably secured at the starting-point of the blank. When the requisite number of cleats—as, for example, four—are placed end to end in each track or guideway, the strips of veneering 2 are then laid crosswise with their ends resting upon said cleats, and the material is then ready to be fed through the machine. As a matter of further and special improvement the said means for holding and feeding the blank materials through the machine consist of a couple of parallel and laterally-movable clamping-bars D and D', these clamping-bars being associated, respectively, with the guides C and C'. With this arrangement the cleats 1 are adapted to be clamped tightly between the said clamping-bars and the vertical flanges of the guides. In order that the said clamping-bars may securely grip the said cleats and slide them forward without disturbing their relative position, the face of each clamping-bar is preferably serrated or roughened, as shown in Fig. 23. Furthermore, each laterally-adjustable clamping-bar is arranged to slide in and be operated by a laterally-adjustable guide bar or way. For example, the guides or ways E and E', associated, respectively, with the clamping-bars D and D', may be arranged inside of the said clamping-bars and provided with portions adapted to slide in the dovetail grooves $a^2$ of the supporting-bars or cross-pieces $a'$ of the body-frame. In this way the cleats can all be gripped and caused to slide forward in their guides or ways, and when the blank is finished the laterally-movable or adjustable guides E and E' can then be moved toward each other for the purpose of moving the clamping-bars toward each other and away from the inner vertical surfaces of the cleats, the latter by this time having been stapled or otherwise fastened to the binding-wires 3 and the veneering 2. As a simple and effective arrangement the said laterally-movable guides or ways for the clamping-bars can be connected by a link F, having one end pivotally connected with the guide E' and having its other end pivotally connected with a vertically-disposed lever $f$, the latter being pivotally mounted upon some stationary portion of the body-frame. A link $f'$ connects the upper end of this lever with the laterally-movable guide or way E. With respect to the bodily adjustment of the guides toward and away from each other, in order to accommodate blanks of different widths the link F is provided with any suitable means whereby it is endwise adjustable. A shaft G extends longitudinally of the machine and is supported in suitable bearings thereon. At one end (see Fig. 8) the said shaft is provided with an arm $g$ and a ratchet-toothed portion $g'$, the latter being adapted to be engaged by a locking dog or pawl $g^2$. A link $f^2$ connects the guide or way E' with the said arm $g$. The shaft G is also provided with an arm $g^3$, connected with the body-frame by a spring $g^4$. At the end of the machine where the blank materials are placed in the guideways the shaft G is provided with a crank or handle $g^5$. With this arrangement the shaft D can be partially rotated for the purpose of adjusting the guides E E' and their allotted clamping-bars D D' toward and away from each other. For example, after the cleats and the balance of the materials are properly positioned in the tracks or guideways the operator or attendant can then rotate the shaft D for the purpose of causing the endwise slidable or traveling clamping-bars D and D' to move away from each other, and to thereby thoroughly clamp the cleats against the vertical flanges of the tracks C and C'. When this has been done, the ratchet device, consisting of the parts $g'$ and $g^2$, locks the clamping-bars in their operative positions and enables the said bars to maintain their grip upon the cleats until the staples have all been driven or until the finished blank is delivered at the other end of the machine. It will be understood that the connecting and adjusting devices shown in Fig. 8 are duplicated at the other end of the machine, whereby the two ends of the guides E and E' are simultaneously adjusted and moved toward or away from each other.

The means for giving the work-holding means an intermittent or step-by-step feeding movement consists, preferably, of a shaft H, extending across the machine above the shaft B, and provided with a couple of pinions $h$, adapted to engage the rack-teeth $d$ and $d'$, provided on the under sides of the two laterally-adjustable or removable clamping-bars. The intermittent or step-by-step rotation of the shaft H is accomplished by providing it with a ratchet-wheel $h'$, adapted to be engaged by the pawl $h^2$, carried by the vertically-reciprocating and transversely-arranged cross-head I. This member I is given a vertical reciprocation in the vertical guides $i$ by means of eccentric cams $i$, mounted on the opposite ends of the shaft B and connected with the said bar or member I by means of eccentric-straps and pitmen $i^2$. With this arrangement the work-holding means—that is, the laterally-adjustable or movable clamping-bars or "gripping-bars," as they may be called—are given a step forward each time the cross-head I rises or moves upwardly away from the work. As shown in Fig. 7, for example, the binding-wires 3 are mounted on rollers 4, carried by arms 5, secured to the upright portions or guides $i$. These binding-wires, preferably three in number for the style of blank shown, are then led downwardly and below the guide-pulleys 6 and then extend forward beneath the staple-drivers and formers carried by the vertical reciprocating cross-head I. In this connection it will be readily understood that the said staple forming and driving devices may be of any suitable known or approved character and are operated by their connections $i^3$, which extend upwardly and connect with the said bar or member I. Other portions and operative parts of the said staple forming and driving mechanism, preferably three in number for the style of blank shown, are supported by the stationary cross-bar or supporting member $i^4$. For example, the devices J for feeding the wires $j$ from which the staples are made are carried by the bar or member $i^4$ and are operated by the ratchet-pawls $j'$, carried by the upper bar or member I. In this way the downward movement of the bar $i$ is accompanied by the formation and driving of the staples $x$, which latter straddle the parallel longitudinally-extending binding-wires 3 and extend through the veneering 2 and into the cleats 1. Also the wires $j$, from which the staples are formed, are then given a feeding movement, either upon an upward or downward movement of the staple-drivers—for example, as shown in Fig. 7. The feed devices J are operated upon the upstroke of the staple-drivers carried by the bar or member I. Consequently the upstroke of the member I is accompanied by two operations, one the feeding of the work-holding means and the other the feeding of the wire from which the staples are made, and then when the member I again descends the three staples which have been formed are simultaneously driven into the work while it is held stationary by the guides and clamping-bars. When the finished blank reaches the other end of the machine, it is desirable, of course, that the stapling devices be automatically thrown out of operation and that the work-holding means be caused to automatically disengage itself from the finished blank, and also that the work-holding means be caused to automatically return to its normal position or starting-point. This may be accomplished by providing a transversely-arranged rock-shaft K at the delivery end of the machine and by mounting thereon a trip-arm $k$. On this same shaft there is another arm $k'$, having a chain or other suitable connection with the locking dog or pawl $g^2$. At this juncture it will be seen that the laterally-movable guide E' is provided with a longitudinal slot $e$, and that the clamping-bar D' is provided with projections $d^2$ and $d^3$, adapted to travel in said slot. Consequently when the two clamping-bars reach the limit of their forward movement the projection $d^2$ engages the arm $k$, and thereby lifts the locking-dog out of engagement with the ratchet-teeth on the portion $g'$. Automatically unlocked in this way the two clamping-bars are then drawn toward each other by the action of the spring $g^4$, thus releasing the cleats and allowing the two clamping-bars to be returned to their original position or starting-point without interfering with the delivery of the finished blank. In this connection it will be seen that the shaft B is provided with a loose pulley $b$ and a fast pulley $b'$ and with a belt-shifter $b^2$. This belt-shifter is operated by a foot-treadle $b^3$, through the medium of a crank-arm $b^4$ and a transversely-arranged and endwise-reciprocating rod $b^5$. Referring to Figs. 2 and 10, it will be seen that the rod $b^5$ is provided with a tooth $b^6$, adapted to engage a bell-crank-shaped locking device $b^7$, pivotally mounted upon the side of the body-frame A. With this arrangemnt the depression of the foot-treadle $b^3$ results in the shifting of the belt from the loose pulley to the fast pulley and in the locking of the parts in such condition by the engagement of the tooth $b^6$ with the latch or locking device $b^7$. This latch or locking device $b^7$ is connected by a rod $b^8$ with an arm $b^9$, carried by the rock-shaft K and subject to the action of the spring $b^{10}$. When the clamping-bars reach the limit of their forward movement and when the rock-shaft K is rocked to automatically release the finished blank, the rod $b^8$ is reciprocated in a direction to lift the finger or end portion of the latch or locking device $b^7$ out of engagement with the tooth $b^6$ on the rod $b^5$. At the same time the projection $d^3$ strikes the beveled upper end portion L of the vertically-disposed shifting-lever $l$, which latter is pivotally mounted at $l'$ upon some stationary portion of the machine. The lower end of this lever $l$ is, it will be seen, connected with a rod $l^2$, having its other end pivotally connected with a horizontally-disposed and horizontally-springing lever $l^3$, which latter is pivotally mounted at $l^4$ upon some stationary portion of the machine. The free end portion of this lever $l^3$ engages a couple of rollers $l^5$, carried by the rod $b^5$, the distance between these two rollers being such that the lever $l^3$ has what may be called a "lost-motion" connection with the belt-shifter rod $b^5$. The shaft H is provided with a friction-clutch M, adapted to be operated by a rod $m$, having suitable connection with the lever $l$ at a point between its lower end and its pivotal point $l'$. In this way the engagement of the projection $d^3$ with the portion L not only shifts the belt to the loose pulley $b$, but also automatically closes the normally open friction-clutch M, the loose member of which latter is being constantly driven by another belt. Thus the arrival of the work-holding means at the delivery end of the machine and the finishing of the blank are followed by the automatic disconnection of the power-shaft B from the constantly-running driving-belt and by the automatic connection of the power with the shaft H by reason of the closing of the friction-clutch M. In this way the staple forming and driving devices are automatically stopped when they rise after driving the last three staples, the blank or finished product is automatically released and delivered at the end of the machine, and the direction of rotation of the shaft H is automatically reversed and the work-holding means given a quick return movement to its normal position or starting-point. Upon the arrival of the clamping-bars constituting the work moving or holding means at their normal position or starting-point the beveled rear surface of the projection $d^2$ engages the beveled end portion $l^6$ of the upper end of the lever $l$, thereby automatically opening the clutch M and also slightly shifting the rod $l^2$; but this movement of the lever $l$ is not sufficient to move the rod $b^5$, owing to the lost-motion connection between the latter and the lever $l^3$. The opening of the clutch M, however, automatically stops the operation of the entire machine, permitting the work-holding means to come to an at-rest position at the point where it can again be loaded with the necessary materials. When the next set of cleats and strips of veneering have been properly adjusted in place, the attendant or operator again presses the foot-treadle $b^3$ and the machine then repeats the foregoing operation.

Preferably a slight lost-motion connection is provided between the rod $b^8$ and the locking device $b^7$, as shown more clearly in Fig. 12. It will also be seen that the outside staples can be clenched upon the bottoms of the guides C and C', while the center staples can be engaged upon a block or support N. Furthermore, it will be readily understood that the three stapling mechanisms, or at least the two outer supporting mechanisms, can be mounted for adjustment toward and away from each other, so as to permit the machine to accommodate itself to blanks of different widths. In other words, the two outside stapling mechanisms must always be in line with the guides regardless of the distance between the latter. As the cleats for the blank are preferably step-mitered at their ends before being placed in the machine, I find it desirable to employ step-miter blocks O, such as are shown in Fig. 30. These little blocks of metal or other material can be placed in the tracks or ways and arranged between the ends of the cleats, so as to keep the latter the proper distance apart. In other words, the first cleats can be placed in the machine with their ends in engagement with the previously-described gage-pieces. A pair of miter-blocks O can then be placed, one on each guideway, in engagement with the other ends of these cleats. Then another pair of cleats can be placed one in each guideway with their ends in engagement with the said miter-blocks. Another pair of miter-blocks can then be applied to the ends of the cleats last placed in position, and so on until the requisite amount of material is in the bed or work-holding structure of the machine. Furthermore, it will be seen that the two endwise-reciprocating and laterally-movable and laterally-adjustable clamping-bars D and D' are provided with portions which fit within grooves provided in the endwise-stationary but laterally-movable and laterally-adjustable guides or ways E and E'. With this arrangement said clamping-bars can slide longitudinally relatively to the stationary tracks C and C' and relatively to the laterally-movable tracks or guides D and D', but must always move laterally or toward and away from each other when a lateral opening and closing movement is given the bars or guides E and E'; but as previously explained all of the guides and clamping-bars at opposite sides of the machine are relatively adjustable toward and away from each other with respect to blanks of different widths.

Thus it will be seen that I provide a machine in which the cleats are held end to end and maintained in a direct forward movement by a reciprocating work-holding means and that the power is communicated from the said reciprocating work-holding means through the cleats to the binding-wires, whereby both the cleats and binding-wires and the balance of the blank material are given a step-by-step feeding motion in the required direction. After the successive operations necessary for driving all the staples the finished blank is then automatically released and the work-holding means then automatically returned to the position where it can be reloaded with fresh material. Also, as explained, the work-holding means remains in its normal position until the operator or attendant again starts the machine.

With the provision of the lost-motion connection P (shown in Figs. 15 and 17) it is obvious that the lever $l$ can be operated by the connections from the foot lever or treadle $b^3$ when it is desired to again start the machine without in any way affecting the condition of the friction-clutch M. In other words, it only requires a very slight movement to operate said friction-clutch, and with the arrangement shown, consisting of the lost-motion connection P, having a spring $p$, the maximum movement can be given the lever $l$ after the friction-clutch has been opened without further affecting said clutch. The lever $l$ is provided with a pin $p'$, which slides in the slot $p^2$, provided in the rectangular frame-like member carried by the end of the rod $m$. The pin $p'$ rests against one end of the spring, while the other end of the spring bears against the end wall of the said rectangular frame-like member. In this way the lever pulls against the spring in opening the clutch and then compresses the spring when the treadle $b^3$ is pressed for the purpose of again starting the operation of the machine.

As the guide or longitudinal bar E' is provided with a slot, and thereby divided into upper and lower parallel sections, its two parts can be rigidly connected by brackets Q or by any other suitable means. With respect to the adjustment of the different parts when it is desired to make a narrower or wider blank it will be seen that the two pinions $h$ can be adjusted along the shaft H. Of course it is possible to contract the distance between the two tracks or guideways by simply shifting one of them toward the other, and then one of the said pinions $h$ can be shifted toward the other and the stapling mechanism adjusted accordingly, and if this method is employed the support or center piece N can also be adjusted accordingly. In any event, however, the staple-driving devices and the cleat-holding devices are all capable of relative adjustment toward and away from each other with respect to blanks of different widths.

What I claim as my invention is—

1. A machine for making wire-bound and cleat-reinforced box-blanks, comprising means for driving staples to secure the binding-wires and cleats to the body of the blank, and means for guiding the binding-wires to the means for driving the staples, guides for the cleats, cleat-engaging members for moving the cleats forward in their guides, means for giving said cleat-engaging members a step-by-step forward feeding motion, together with automatic means for releasing the finished blank, and means for returning said cleat-engaging members to their normal or at-rest positions, there being provisions for automatically stopping the staple-driving means during the return movement of the said means for engaging and moving the cleats endwise.

2. A machine for making wire-bound and cleat-reinforced box-blanks, comprising means for driving staples to secure the binding-wires and cleats to the body of the blank, and means for guiding the binding-wires to the means for driving the staples, guides for the cleats, laterally-movable clamping-bars adapted to engage the inner sides of the cleats and hold the same firmly in their guides, means for giving the said clamping-bars a step-by-step forward feeding motion for the purpose of advancing the cleats in their guides, together with automatic means for drawing said clamping-bars together upon the completion of the blank, and means for automatically returning the said clamping-bars to their normal or at-rest positions, there being provisions for automatically stopping the staple-driving means during the return movement of the said means for engaging and moving the cleats endwise.

3. A machine for making wire-bound and cleat-reinforced box-blanks, comprising means for driving staples to secure the binding-wires and cleats to the body of the blank, and means for guiding the binding-wires to the means for driving the staples, guides for the cleats, cleat-engaging means for advancing the cleats in their guides, devices for giving the said cleat-engaging means a step-by-step forward feeding motion, automatic means for releasing the finished blank, and means for returning the cleat-engaging means to its normal or at-rest position, there being provisions for automatically stopping the staple-driving means during the return movement of the said means for engaging and moving the cleats endwise.

4. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, devices for engaging and moving the cleats forward in their guides, automatic means for releasing the finished blank, devices for stopping the operation of the means for driving the fastening devices, automatic means for reversing the motion of the cleat-engaging devices as soon as the finished blank is released, together with automatic means for stopping the operation of the machine upon the arrival of the said cleat-engaging devices at their normal or at-rest positions.

5. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, a pair of clamping-bars adapted to engage the inner sides of the cleats and hold the same firmly in their guides, feeding devices for giving the said clamping-bars an intermittent or step-by-step forward feeding motion for the purpose of advancing the cleats in their guides, automatic means for releasing the cleats upon the completion of the blank, together with automatic means for returning the clamping-bars to their normal positions or starting-points, and means for automatically discontinuing the operation of the said means for driving fastening devices as soon as the blank is completed and until after the guides are reloaded with blank material and the machine again started.

6. A machine for making wire-bound and cleat-reinforced box-blanks, comprising means for driving staples to secure the binding-wires and cleats to the body of the blank, and means for guiding the binding-wires to the means for driving the staples, guides for the cleats, and a reciprocating work-holding means adapted to engage the cleats, together with means for giving the said work-holding means a step-by-step motion in a direction to advance the cleats in their guides, and means for effecting a continuous return movement of the work-holding means to its normal or at-rest position after the finished blank has been delivered at the other end of the machine, there being provisions for automatically stopping the staple-driving means during the return movement of the said means for engaging and moving the cleats endwise.

7. A machine for making wire-bound and cleat-reinforced box-blanks, comprising means for driving staples to secure the binding-wires and cleats to the body of the blank, and means for guiding the binding-wires to the means for driving the staples, guides for the cleats, cleat-engaging members for moving the cleats forward in their guides, means for giving said cleat-engaging members a step-by-step forward feeding motion, together with automatic means for releasing the finished blank, and means for returning said cleat-engaging members to their normal or at-rest positions, the machine as a whole comprising suitable means whereby the cleat holding and guiding devices are adjustable toward and away from each other with respect to blanks of different widths, there being provisions for automatically stopping the staple-driving means during the return movement of the said means for engaging and moving the cleats endwise.

8. A machine for making wire-bound and cleat-reinforced box-blanks, comprising means for driving staples to secure the binding-wires and cleats to the body of the blank, and means for guiding the binding-wires to the means for driving the staples, guides for the cleats, laterally-movable clamping-bars adapted to engage the inner sides of the cleats and hold the same firmly in their guides, means for giving the said clamping-bars a step-by-step forward feeding motion for the purpose of advancing the cleats in their guides, together with automatic means for drawing said clamping-bars together upon the completion of the blank, and means for automatically returning the said clamping-bars to their normal or at-rest positions, the machine also comprising suitable means whereby the cleat holding and guiding devices are adjustable toward and away from each other with respect to blanks of different widths, there being provisions for automatically stopping the staple-driving means during the return movement of the said means for engaging and moving the cleats endwise.

9. A machine for making wire-bound and cleat-reinforced box-blanks, comprising means for driving staples to secure the binding-wires and cleats to the body of the blank, and means for guiding the binding-wires to the means for driving the staples, guides for the cleats, cleat-engaging means for advancing the cleats in their guides, together with devices for giving the said cleat-engaging means a step-by-step forward feeding motion, and automatic means for releasing the finished blank, and means for returning the cleat-engaging means to its normal or at-rest position, the machine also comprising suitable means whereby the cleat holding and guiding devices are adjustable toward and away from each other with respect to blanks of different widths, there being provisions for automatically stopping the staple-driving means during the return movement of the said means for engaging and moving the cleats endwise.

10. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, devices for engaging and moving the cleats forward in their guides, automatic means for releasing the finished blank, means for stopping the operation of the means for driving the fastening devices, automatic means for reversing the motion of the cleat-engaging devices as soon as the finished blank is released, together with automatic means for stopping the operation of the machine upon the arrival of the said cleat-engaging devices at their normal or at-rest positions, and the machine also comprising suitable means whereby the cleat holding and guiding devices are adjustable toward and away from each other with respect to blanks of different widths.

11. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, a pair of clamping-bars adapted to engage the inner sides of the cleats and hold the same firmly in their guides, feeding devices for giving the said clamping-bars an intermittent or step-by-step forward feeding motion for the purpose of advancing the cleats in their guides, automatic means for releasing the cleats upon the completion of the blank, together with automatic means for returning the clamping-bars to their normal positions or starting-points, and means for automatically discontinuing the operation of the said means for driving fastening devices as soon as the blank is completed and until after the guides are reloaded with blank material and the machine again started, the machine also comprising suitable means whereby the cleat holding and guiding devices are adjustable toward and away from each other with respect to blanks of different widths.

12. A machine for making wire-bound and cleat-reinforced box-blanks, comprising means for driving staples to secure the binding-wires and cleats to the body of the blank, and means for guiding the binding-wires to the means for driving the staples, guides for the cleats, and a reciprocating work-holding means adapted to engage the cleats, together with means for giving the said work-holding means a step-by-step motion in a direction to advance the cleats in their guides, and means for effecting a continuous return movement of the work-holding means to its normal or at-rest position after the finished blank has been delivered at the other end of the machine, the machine also comprising suitable means whereby the cleat holding and guiding devices are adjustable toward and away from each other with respect to blanks of different widths, there being provisions for automatically stopping the staple-driving means during the return movement of the said means for engaging and moving the cleats endwise.

13. A machine for making wire-bound and cleat-reinforced box-blanks, comprising means for driving staples to secure the binding-wires and cleats to the body of the blank, and means for guiding the binding-wires to the means for driving the staples, guides for the cleats, cleat-engaging members for moving the cleats forward in their guides, means for giving said cleat-engaging members a step-by-step forward feeding motion, together with automatic means for releasing the finished blank, and means for returning said cleat-engaging members to their normal or at-rest positions, and the machine also comprising a pair of parallel and longitudinally-extending bars which are movable toward and away from each other, but which are held against endwise movement, and which constitute means adapted to move the cleat-engaging members into and out of engagement with the inner sides of the cleats, there being provisions for automatically stopping the staple-driving means during the return movement of the said means for engaging and moving the cleats endwise.

14. A machine for making wire-bound and cleat-reinforced box-blanks, comprising means for driving staples to secure the binding-wires and cleats to the body of the blank, and means for guiding the binding-wires to the means for driving the staples, guides for the cleats, laterally-movable clamping-bars adapted to engage the inner sides of the cleats and hold the same firmly in their guides, means for giving the said clamping-bars a step-by-step forward feeding motion for the purpose of advancing the cleats in their guides, together with automatic means for drawing said clamping-bars together upon the completion of the blank, and means for automatically returning the said clamping-bars to their normal or at-rest positions, the machine also comprising a pair of parallel and longitudinally-extending bars which are movable toward and away from each other, but which are held against endwise movement, and which constitute means adapted to move the clamping-bars into and out of engagement with the inner sides of the cleats, there being provisions for automatically stopping the staple-driving means during the return movement of the said means for engaging and moving the cleats endwise.

15. A machine for making wire-bound and cleat-reinforced box-blanks, comprising means for driving staples to secure the binding-wires and cleats to the body of the blank, and means for guiding the binding-wires to the means for driving the staples, guides for the cleats, cleat-engaging means for advancing the cleats in their guides, together with devices for giving the said cleat-engaging means a step-by-step forward feeding motion, automatic means for releasing the finished blank, and means for returning the cleat-engaging means to its normal or at-rest position, the machine also comprising a pair of parallel and longitudinally-extending bars which are movable toward and away from each other, but which are held against endwise movement, and which constitute means adapted to move the cleat-engaging means into and out of engagement with the inner sides of the cleats, there being provisions for automatically stopping the staple-driving means during the return movement of the said means for engaging and moving the cleats endwise.

16. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, devices for engaging and moving the cleats forward in their guides, automatic means for releasing the finished blank, devices for stopping the operation of the means for driving the fastening devices, automatic means for reversing the motion of the cleat-engaging devices as soon as the finished blank is released, together with automatic means for stopping the operation of the machine upon the arrival of the said cleat-engaging devices at their normal or at-rest positions, and the machine also comprising a pair of parallel and longitudinally-extending bars which are movable toward and away from each other, but which are held against endwise movement, and which constitute means adapted to move the cleat-engaging devices into and out of engagement with the inner sides of the cleats.

17. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, a pair of clamping-bars adapted to engage the inner sides of the cleats and hold the same firmly in their guides, feeding devices for giving the said clamping-bars an intermittent or step-by-step forward feeding motion for the purpose of advancing the cleats in their guides, automatic means for releasing the cleats upon the completion of the blank, together with automatic means for returning the clamping-bars to their normal positions or starting-points, and means for automatically discontinuing the operation of the said means for driving fastening devices as soon as the blank is completed and until after the guides are reloaded with blank material and the machine again started, the machine also comprising a pair of parallel and longitudinally-extending bars which are movable toward and away from each other, but which are held against endwise movement, and which constitute means adapted to move the clamping-bars into and out of engagement with the inner sides of the cleats.

18. A machine for making wire-bound and cleat-reinforced box-blanks, comprising means for driving staples to secure the binding-wires and cleats to the body of the blank, and means for guiding the binding-wires to the means for driving the staples, guides for the cleats, and a reciprocating work-holding means adapted to engage the cleats, together with means for giving the said work-holding means a step-by-step motion in a direction to advance the cleats in their guides, and means for effecting a continuous return movement of the work-holding means to its normal or at-rest position after the finished blank has been delivered at the other end of the machine, and the machine also comprising a pair of parallel and longitudinally-extending bars which are movable toward and away from each other, but which are held against endwise movement, and which constitute means adapted to move the work-holding means into and out of engagement with the inner sides of the cleats, there being provisions for automatically stopping the staple-driving means during the return movement of the said means for engaging and moving the cleats endwise.

19. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, cleat-engaging members for moving the cleats forward in their guides, means for giving said cleat-engaging members a step-by-step forward feeding motion, together with automatic means for releasing the finished blank, and means for returning said cleat-engaging members to their normal or at-rest positions, the said machine also comprising a device for manually driving the cleat-engaging means into engagement with the cleats.

20. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, laterally-movable clamping-bars adapted to engage the inner sides of the cleats and hold the same firmly in their guides, means for giving the said clamping-bars a step-by-step forward feeding motion for the purpose of advancing the cleats in their guides, together with automatic means for drawing said clamping-bars together upon the completion of the blank, and means for automatically returning the said clamping-bars to their normal or at-rest positions, the said machine also comprising a device for manually driving the cleat-engaging means into engagement with the cleats.

21. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, cleat-engaging means for advancing the cleats in their guides, together with devices for giving the said cleat-engaging means a step-by-step forward feeding motion, automatic means for releasing the finished blank, and means for returning the cleat-engaging means to its normal or at-rest position, the said machine also comprising a device for manually driving the cleat-engaging members into engagement with the cleats.

22. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, devices for engaging and moving the cleats forward in their guides, automatic means for releasing the finished blank, means for stopping the operation of the means for driving the fastening devices, automatic means for reversing the motion of the cleat-engaging devices as soon as the finished blank is released, together with automatic means for stopping the operation of the machine upon the arrival of the said cleat-engaging devices at their normal or at-rest positions, and the said machine also comprising a device for manually driving the cleat-engaging means into engagement with the cleats.

23. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, a pair of clamping-bars adapted to engage the inner sides of the cleats and hold the same firmly in their guides, feeding devices for giving the said clamping-bars an intermittent or step-by-step forward feeding motion for the purpose of advancing the cleats in their guides, automatic means for releasing the cleats upon the completion of the blank, together with automatic means for returning the clamping-bars to their normal positions or starting-points, and means for automatically discontinuing the operation of the said means for driving fastening devices as soon as the blank is completed and until after the guides are reloaded with blank material and the machine again started, the said machine also comprising a device for manually driving the cleat-engaging means into engagement with the cleats.

24. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, and a reciprocating work-holding means adapted to engage the cleats, together with means for giving the said work-holding means a step-by-step motion in a direction to advance the cleats in their guides, and means for effecting a continuous return movement of the work-holding means to its normal or at-rest position after the finished blank has been delivered at the other end of the machine, and the said machine also comprising a device for manually driving the cleat-engaging means into engagement with the cleats.

25. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, cleat-engaging members for moving the cleats forward in their guides, means for giving said cleat-engaging members a step-by-step forward feeding motion, together with automatic means for releasing the finished blank, means for returning said cleat-engaging members to their normal or at-rest positions, and suitable means whereby the power and motion is communicated to the cleats through rack-and-pinion connections, said cleat-engaging members being provided with means for preventing the back pull of the binding-wires from causing endwise displacement of the cleats.

26. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, laterally-movable clamping-bars adapted to engage the inner sides of the cleats and hold the same firmly in their guides, means for giving the said clamping-bars a step-by-step forward feeding motion for the purpose of advancing the cleats in their guides, together with automatic means for drawing said clamping-bars together upon the completion of the blank, means for automatically returning the said clamping-bars to their normal or at-rest positions, and suitable means whereby the power and motion is communicated to the cleats through rack-and-pinion connections, the said clamping-bars having means for preventing endwise displacement of the cleats by the back pull of the binding-wires.

27. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, cleat-engaging means for advancing the cleats in their guides, together with devices for giving the said cleat-engaging means a step-by-step forward feeding motion, automatic means for releasing the finished blank, means for returning the cleat-engaging means to its normal or at-rest position, and suitable means whereby the power and motion is communicated to the cleats through rack-and-pinion connections, the said cleat-engaging means having means for preventing endwise displacement of the cleats by the back pull of the binding-wires.

28. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, devices for engaging and moving the cleats forward in their guides, automatic means for releasing the finished blank, means for stopping the operation of the means for driving the fastening devices, automatic means for reversing the motion of the cleat-engaging devices as soon as the finished blank is released, together with automatic means for stopping the operation of the machine upon the arrival of the said cleat-engaging devices at their normal or at-rest positions, and suitable means whereby the power and motion is communicated to the cleats through rack-and-pinion connections.

29. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, a pair of clamping-bars adapted to engage the inner sides of the cleats and hold the same firmly in their guides, feeding devices for giving the said clamping-bars an intermittent or step-by-step forward feeding motion for the purpose of advancing the cleats in their guides, automatic means for releasing the cleats upon the completion of the blank, together with automatic means for returning the clamping-bars to their normal positions or starting-points, means for automatically discontinuing the operation of the said means for driving fastening devices as soon as the blank is completed and until after the guides are reloaded with blank material and the machine again started, and suitable means whereby the power and motion is communicated to the cleats through rack-and-pinion connections.

30. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, and a reciprocating work-holding means adapted to engage the cleats, together with means for giving the said work-holding means a step-by-step motion in a direction to advance the cleats in their guides, and means for effecting a continuous return movement of the work-holding means to its normal or at-rest position after the finished blank has been delivered at the other end of the machine, and suitable means whereby the power and motion is communicated to the cleats through rack-and-pinion connections, the said work-holding means having provisions for preventing endwise displacement of the cleats by the back pull of the binding-wires.

31. A machine for making wire-bound and cleat-reinforced box-blanks, comprising means for driving staples to secure the binding-wires and cleats to the body of the blank, and means for guiding the binding-wires to the means for driving the staples, guides for the cleats, cleat-engaging members for moving the cleats forward in their guides, means for giving said cleat-engaging member a step-by-step forward feeding motion, together with automatic means for releasing the finished blank, and means for returning said cleat-engaging members to their normal or at-rest positions, and the machine comprising suitable means whereby the clamping or gripping of the cleats, and also the releasing of the cleats after the blank is finished, are accomplished through the medium of connections extending across the machine, and through the medium of a longitudinally-extending rock-shaft having suitable connection with said transverse connections; there being provisions for automatically stopping the staple-driving means during the return movement of the said means for engaging and moving the cleats endwise.

32. A machine for making wire-bound and cleat-reinforced box-blanks, comprising means for driving staples to secure the binding-wires and cleats to the body of the blank, and means for guiding the binding-wires to the means for driving the staples, guides for the cleats, laterally-movable clamping-bars adapted to engage the inner sides of the cleats and hold the same firmly in their guides, means for giving the said clamping-bars a step-by-step forward feeding motion for the purpose of advancing the cleats in their guides, together with automatic means for drawing said clamping-bars together upon the completion of the blank, and means for automatically returning the said clamping-bars to their normal or at-rest positions, and the machine also comprising suitable means whereby the clamping or gripping of the cleats, and also the releasing of the cleats after the blank is finished, are accomplished through the medium of connections extending across the machine, and through the medium of a longitudinally-extending rock-shaft having suitable connection with said transverse connections, there being provisions for automatically stopping the staple-driving means during the return movement of the said means for engaging and moving the cleats endwise.

33. A machine for making wire-bound and cleat-reinforced box-blanks, comprising means for driving staples to secure the binding-wires and cleats to the body of the blank, and means for guiding the binding-wires to the means for driving the staples, guides for the cleats, cleat-engaging means for advancing the cleats in their guides, together with devices for giving the said cleat-engaging means a step-by-step forward feeding motion, automatic means for releasing the finished blank, and means for returning the cleat-engaging means to its normal or at-rest position, the machine comprising suitable means whereby the clamping or gripping of the cleats, and also the releasing of the cleats after the blank is finished, are accomplished through the medium of connections extending across the machine, and through the medium of a longitudinally-extending rock-shaft having suitable connection with said transverse connections, there being provisions for automatically stopping the staple-driving means during the return movement of the said means for engaging and moving the cleats endwise.

34. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, devices for engaging and moving the cleats forward in their guides, automatic means for releasing the finished blank, means for stopping the operation of the means for driving the fastening devices, automatic means for reversing the motion of the cleat-engaging devices as soon as the finished blank is released, together with automatic means for stopping the operation of the machine upon the arrival of the said cleat-engaging devices at their normal or at-rest positions, and the machine also comprising suitable means whereby the clamping or gripping of the cleats, and also the releasing of the cleats after the blank is finished, are accomplished through the medium of connections extending across the machine, and through the medium of a longitudinally-extending rock-shaft having suitable connection with said transverse connections.

35. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, a pair of clamping-bars adapted to engage the inner sides of the cleats and hold the same firmly in their guides, feeding devices for giving the said clamping-bars an intermittent or step-by-step forward feeding motion for the purpose of advancing the cleats in their guides, automatic means for releasing the cleats upon the completion of the blank, together with automatic means for returning the clamping-bars to their normal positions or starting-points, and means for automatically discontinuing the operation of the said means for driving fastening devices as soon as the blank is completed and until after the guides are reloaded with blank material and the machine again started, the machine comprising also suitable means whereby the clamping or gripping of the cleats, and also the releasing of the cleats after the blank is finished, are accomplished through the medium of connections extending across the machine, and through the medium of a longitudinally-extending rock-shaft having suitable connection with said transverse connections.

36. A machine for making wire-bound and cleat-reinforced box-blanks, comprising means for driving staples to secure the binding-wires and cleats to the body of the blank, and means for guiding the binding-wires to the means for driving the staples, guides for the cleats, and a reciprocating work-holding means adapted to engage the cleats, together with means for giving the said work-holding means a step-by-step motion in a direction to advance the cleats in their guides, and means for effecting a continuous return movement of the work-holding means to its normal or at-rest position after the finished blank has been delivered at the other end of the machine, the machine also comprising suitable means whereby the clamping or gripping of the cleats, and also the releasing of the cleats after the blank is finished, are accomplished through the medium of connections extending across the machine, and through the medium of a longitudinally-extending rock-shaft having suitable connection with said transverse connections, there being provisions for automatically stopping the staple-driving means during the return movement of the said means for engaging and moving the cleats endwise.

37. A machine for making wire-bound and cleat-reinforced box-blanks, comprising means for driving fastening devices to secure the binding-wires and cleats to the body of the blank, and means for guiding the binding-wires to the means for driving fastening devices, guides for the cleats, cleat-engaging members for moving the cleats forward in their guides, means for giving said cleat-engaging members a step-by-step forward feeding motion, together with automatic means for releasing the finished blank, and means for returning said cleat-engaging members to their normal or at-rest positions, the cleat guiding and engaging means thus provided being adapted to hold the cleats of a blank end to end in parallel and longitudinally-advancing rows, and thereby keep the longitudinal or endwise motion of the cleats direct, and the said cleat-engaging members having means to prevent the drag or back pull of the binding-wires from causing endwise displacement of the cleats.

38. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, laterally-movable clamping-bars adapted to engage the inner sides of the cleats and hold the same firmly in their guides, means for giving the said clamping-bars a step-by-step forward feeding motion for the purpose of advancing the cleats in their guides, together with automatic means for drawing said clamping-bars together upon the completion of the blank, and means for automatically returning the said clamping-bars to their normal or at-rest positions, the cleat guiding and engaging means thus provided being adapted to hold the cleats of a blank end to end in parallel and longitudinally-advancing rows, and thereby keep the longitudinal or endwise motion of the cleats direct, and the said cleat-engaging bars having means to prevent the drag or back pull of the binding-wires from causing endwise displacement of the cleats.

39. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, devices for engaging and moving the cleats forward in their guides, automatic means for releasing the finished blank, devices for stopping the operation of the means for driving the fastening devices, automatic means for reversing the motion of the cleat-engaging devices as soon as the finished blank is released, together with automatic means for stopping the operation of the machine upon the arrival of the said cleat-engaging devices at their normal or at-rest positions, the cleat guiding and engaging means thus provided being adapted to hold the cleats of a blank end to end in parallel and longitudinally-advancing rows, and thereby keep the longitudinal or endwise motion of the cleats direct, and the said cleat-engaging devices having means to prevent the drag or back pull of the binding-wires from causing endwise displacement of the cleats.

40. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, cleat-engaging means for advancing the cleats in their guides, devices for giving the said cleat-engaging means a step-by-step forward feeding motion, automatic means for releasing the finished blank, and means for returning the cleat-engaging means to its normal or at-rest position, the cleat guiding and engaging means thus provided being adapted to hold the cleats of a blank end to end in parallel and longitudinally-advancing rows, and thereby keep the longitudinal or endwise motion of the cleats direct, and the said cleat engaging means having suitable provisions to prevent the drag or back pull of the binding-wires from causing endwise displacement of the cleats.

41. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, a pair of clamping-bars adapted to engage the inner sides of the cleats and hold the same firmly in their guides, feeding devices for giving the said clamping-bars an intermittent or step-by-step forward feeding motion for the purpose of advancing the cleats in their guides, automatic means for releasing the cleats upon the completion of the blank, together with automatic means for returning the clamping-bars to their normal positions or starting-points, and means for automatically discontinuing the operation of the said means for driving fastening devices as soon as the blank is completed and until after the guides are reloaded with blank material and the machine again started, the cleat guiding and engaging means thus provided being adapted to hold the cleats of a blank end to end in parallel and longitudinally-advancing rows, and thereby keep the longitudinal or endwise motion of the cleats direct, and the said cleat-engaging bars having means to prevent the drag or back pull of the binding-wires from causing endwise displacement of the cleats.

42. A machine for making wire-bound and cleat-reinforced box-blanks, comprising means for driving fastening devices to secure the binding-wires and cleats to the body of the blank, and means for guiding the binding-wires to the means for driving the fastening devices, guides for the cleats, and a reciprocating work-holding means adapted to engage the cleats, together with means for giving the said work-holding means a step-by-step motion in a direction to advance the cleats in their guides, and a continuous motion in a direction to return the work-holding means to its normal or at-rest position after the finished blank has been delivered at the other end of the machine, the cleat guiding and engaging means thus provided being adapted to hold the cleats of a blank end to end in parallel and longitudinally-advancing rows, and thereby keep the longitudinal or endwise motion of the cleats direct, and the said cleat-engaging means having suitable provisions to prevent the drag or back pull of the binding-wires from causing endwise displacement of the cleats.

43. A machine for making wire-bound and cleat-reinforced box-blanks, comprising means for holding the cleats of a blank end to end in parallel and longitudinally-advancing rows, means for guiding the binding-wires to the upper surface of the blank, means for inserting fastening devices to secure the binding-wires and different parts of the blank together, feed mechanism for advancing the blank materials, and a plurality of loose spacing-blocks insertible between the ends of the cleats and removable from the machine with the finished blank, together with means for preventing the back pull of the binding-wires from causing endwise displacement of the cleats.

44. In a machine of the character specified, parallel cleat-guides, parallel engaging members for engaging the inner sides of the cleats and holding the same end to end in the said guides, means for moving said engaging members endwise, and thereby moving the cleats endwise, and means for moving the members laterally to grip and release the cleats.

45. In a machine of the character specified, parallel cleat-guides, parallel engaging members for engaging the inner sides of the cleats and holding the same end to end in the said guides, means for moving said engaging members endwise, and thereby moving the cleats endwise, and means for moving the members laterally to grip and release the cleats, together with means for applying flexible connections between the ends of the cleats, connections for automatically reversing the endwise motion of said members, and means for automatically stopping the operation of the means for applying flexible connections during the return movement of the said members.

46. In a machine of the character specified, means for applying binding-wires to the blank, a combined reciprocating work-holder and binding-wire puller, adapted to communicate motion through the work to the binding-wires, means for reciprocating the work-holder, and provisions whereby the motion of the same is relatively slow and intermittent in one direction, and relatively quick and continuous in the opposite direction.

47. In a machine of the character disclosed, guides for the cleats, a pair of parallel bars for engaging and moving the cleats endwise, and connections for moving said bars toward and away from each other for the purpose of gripping and releasing the cleats.

Signed by me at St. Joseph, Michigan, this 23d day of May, 1905.

JULIUS J. MILLER.

Witnesses:
A. L. CHURCH,
A. CANAVAN.